United States Patent [19]

Van Allen

[11] 4,304,479
[45] Dec. 8, 1981

[54] PHOTOGRAPHIC LIGHTING APPARATUS

[75] Inventor: David E. Van Allen, Malden, Mass.

[73] Assignee: Polaroid Corporation, Cambridge, Mass.

[21] Appl. No.: 172,778

[22] Filed: Jul. 28, 1980

[51] Int. Cl.³ .................. G03B 15/03; F21Y 7/00
[52] U.S. Cl. .................. 354/145; 362/16; 362/297
[58] Field of Search ............... 354/126–129, 354/132, 145, 148, 149; 362/3, 4, 16–18

[56] References Cited

U.S. PATENT DOCUMENTS

| | | | |
|---|---|---|---|
| 1,235,276 | 7/1917 | Wood | 362/297 |
| 1,367,439 | 2/1921 | Thompson | 362/310 |
| 1,471,767 | 10/1923 | Wood | 362/304 |
| 1,517,322 | 12/1924 | Templin | 362/347 |
| 2,006,140 | 6/1935 | Honing | 313/113 |
| 3,204,542 | 9/1965 | Strasser et al. | 362/18 X |
| 3,226,536 | 12/1965 | Atkin et al. | 362/220 |
| 3,286,611 | 11/1966 | Lange | 354/149 |
| 3,375,361 | 3/1968 | Thompson et al. | 362/17 X |
| 3,458,696 | 7/1969 | Kapteyn et al. | 362/3 |
| 3,609,332 | 9/1971 | Schindler | 362/16 |
| 3,783,261 | 1/1974 | Hartmann | 362/18 |
| 4,017,727 | 4/1977 | Yamamoto | 362/16 |
| 4,078,240 | 3/1978 | Kancko | 354/145 X |
| 4,194,234 | 3/1980 | Geissler | 362/17 |
| 4,231,645 | 11/1980 | Davis et al. | 354/145 |

FOREIGN PATENT DOCUMENTS

71637 10/1950 Denmark ............... 362/310

Primary Examiner—Donald A. Griffin
Attorney, Agent, or Firm—Francis J. Caufield

[57] ABSTRACT

A photographic camera having either a built-in or detachably connectable electronic strobe light which provides a preferred illumination distribution over the field of view of the camera in order to maximize flash range and improve the quality of illumination for flash pictures. The strobe is provided with a reflector that is asymmetrically shaped about the horizontal plane having optical power which decreases at different rates about the horizontal plane. This arrangement provides a vertically asymmetric distribution of illumination over the picture area with the peak illumination occurring at the central upper part of the picture area. Side to side illumination of the picture is generally symmetric about the vertical axis and is controlled by a cylindrical Fresnel lens.

10 Claims, 9 Drawing Figures

PHOTOGRAPHIC LIGHTING APPARATUS

BACKGROUND OF THE INVENTION

1. Field of the Invention

This invention in general relates to photography and in particular to a photographic camera having either a built-in or detachably connectable electronic flash having a preferred angular distribution in the intensity of its illumination.

2. Description of the Prior Art

Electronic flash units for providing artificial illumination during photographic exposures to supplement natural light of low intensity are well-known in the art. Such electronic flash units are generally adapted to receive an external, substantially steady state DC battery voltage which powers a voltage converter in a conventional manner to convert the DC voltage, which may be on the order of 6 volts, to a suitable flash operating voltage. A charging current from the voltage converter is directed to a storage capacitor so as to gradually charge the storage capacitor to a DC voltage level which may be on the order of 350 volts. The charge stored in the capacitor is discharged by some suitable means through a tube which is filled with a mixture of rare gases such as argon, krypton or xenon. Through the well-known process of vapor discharge, the energy stored in the capacitor dissipated in this manner produces a brilliant flash of light for illuminating the scene.

The brilliance of the flash depends on the type of tube and the quantity of electrically discharged through it from the capacitor. The output of the tube is measured in watt-seconds or joules and depends on how efficiently the electrical charge stored in the capacitor is converted to radiant energy.

The radiant energy emanating from the tube travels in directions away from the tube which depend on the geometry of the tube. Some of this light naturally falls on the subject while as much or more travels away from the subject and is wasted. To optimize the amount of light falling on the scene, it is the usual practice to provide a selectively shaped reflector for intercepting rays of light traveling away from the subject and directing such rays toward the scene. It is usual to selectively shape such reflectors so that the distribution of the intensity of the illumination falling on the scene is uniform thereover.

Recently, compact versions of such electronic flash units have been adapted for use with self-developing type cameras which utilize film cassettes having a battery therein to provide power for various camera systems. In operation, such electronic flash units are connected to a camera which is loaded with a battery carrying cassette. The camera thereafter provides the electronic flash unit with a steady state input voltage which is utilized by the electronic flash unit to charge its storage capacitor. The storage capacitor is thereafter triggered at an appropriate time during the camera exposure interval by a select trigger signal furnished by the camera to discharge the capacitor through the flash tube thereby providing a source of artificial illumination. Such an electronic flash is described, for example, in U.S. Pat. No. 4,074,295 issued to Richard C. Kee on Feb. 14, 1978 and entitled "Compact Accessory Strobe For Cameras With Battery Enclosed Film Pack" and in U.S. Pat. No. 4,085,414 issued to John P. Burgarella on Apr. 18, 1978 and entitled "Electronic Flash Apparatus With Extendable On/Off Switch Control Apparatus".

In the virtually automatic self-developing type camera that is adapted to utilize an electronic flash and supply the power to charge the capacitor thereof from a battery contained in the film cassette positioned within the camera, it is obviously desirable that the electronic flash unit utilize as little of the battery energy as possible and also to convert that energy in an efficient manner to radiant energy since there are a number of camera electrical systems competing for the power contained in the film cassette battery. Those skilled in the art of designing automatic self-developing type cameras which utilize a single battery of limited capacity to power an entire camera cycle are sensitive to the demands which are placed on such a battery and have designed electronic control apparatus by which different camera electrical systems are automatically scheduled to derive power from the battery at different times in order to minimize current drain and in order to get maximum utility from the battery. For example, U.S. Pat. No. 3,846,812 discloses equipment which operates a flash camera of the automatic self-developing type so that only one operation of significant current drain occurs at a time. A film transport motor and a flash unit of the camera accordingly draw battery current at different times.

With the advent of automatic focusing arrangements for use in the self-developing type cameras, additional electrical operating loads of relatively high current drain are imposed on the camera battery. When such operations overlap with other camera operations of significant current drain, the battery voltage is likely to drop to such a degree that the battery is incapable of properly operating the camera. To overcome the additional current drains imposed by automatic focusing systems which are incorporated in self-developing type cameras those skilled in the art have provided camera control systems by which high current operations such as electronic flash unit charging are scheduled to occur one at a time so that a single battery can effectively power all the camera operations. Such a system is described, for example, in U.S. Pat. No. 4,156,565 issued to George C. Harrison on May 29, 1979 and entitled "Control System For Flash-Illuminated Automatic Focusing Camera".

It is evident in view of the prior art discussed above that electronic flash systems which are utilized in self-developing type cameras of the sort described should make maximum use for scene illumination purposes of whatever power is available as scheduled by the control circuit of the camera. For this purpose it has been the practice in the past to provide reflectors for increasing the illumination which falls on a photographic scene in order to make the most efficient use of the radiant energy available from a flash unit tube. Such reflectors have traditionally been shaped to redirect the illumination from the flash unit tube in such a way that the radiant energy from the flash tube, which includes the direct illumination from the tube as well as that reflected off of the reflector, is distributed so that the intensity thereof is symmetrically disposed about the camera optical axis and is also as uniform as possible.

It is a primary object of the present invention to provide an electronic flash unit which can be either built into a photographic camera or detachably connected thereto to provide a preferred distribution of illumination which permits maximum use of power available to the flash unit such that the maximum flash range of the camera which utilizes the electronic flash unit is greater than it would be with a flash unit having a uniformly distributed illumination pattern operating at similar available power.

Other objects of the ivention will in part be obvious and will in part appear hereinafter. The invention accordingly comprises the apparatus possessing the constuction, combination of elements, and arrangement of parts which are exemplified in the following detailed disclosure.

SUMMARY OF THE INVENTION

This invention in general relates to photography and in particular to photographic camera apparatus having a built-in or detachably connectable electronic flash to provide a beam of illumination having a preferred angular distribution in intensity for preferentially illuminating a scene to be photographed.

The photographic camera apparatus of the invention comprises a housing which includes means for defining an exposure area at a focal plane in which film may be positioned for exposure.

Additionally included is a variable focus objective taking lens having an optical axis and mounted within the housing so that a real image of a scene to be photographed may be formed on the focal plane by the objective taking lens. The objective taking lens and the exposure area at the focal plane cooperate to provide the camera with an angular field of view which determines the subject matter that can be included in the photograph.

A source of illumination is provided for projecting light about an axis therethrough. The source of illumination is positioned within the housing in a predetermined manner and is structured so that light directly emanating therefrom fills a solid angle that is larger than is necessary to illuminate the camera angular field of view.

Additionally included in the apparatus are means for receiving light from the source of illumination which would otherwise not directly illuminate subject matter within the camera angular field of view and directing such light into a beam of illumination of predetermined angular divergence which is generally coextensive with the camera field of view. The beam of illumination operates to increase the total amount of light falling on a scene to be photographed compared with the amount of direct light from the source that would otherwise illuminate a scene absent the light directing means. The beam of illumination has an angular distribution in the intensity of its illumination which is asymmetric about the source projection axis when measured in at least one reference plane through the source projection axis and parallel to the general direction of projection of said beam. The angular intensity distribution of the beam in the reference plane decreases in correspondence with angle on one side of the source projection axis at a faster rate than on the opposite side thereof so that points in a photographic scene, spaced ahead of the camera and located on one side of the camera optical axis, and more intensely illuminated than equidistant correspondingly located scene points on the other side of the camera optical axis. The asymmetric distribution of illumination increases the illumination range of the apparatus with respect to subject matter located on the side of the camera optical axis which is more intensely illuminated.

In the preferred embodiment of the apparatus the illumination source comprises an elongated, cylindrical tube and the light directing means comprises an elongated, open-ended, concave reflector of given width which surrounds the tube and has a constant cross-section as measured in planes perpendicular to its elongated dimension. The reflector cross-section has a shape in the form of a complex curve that is asymmetric about the source projection axis and the curve shape has optical power which changes with distance along the curve. The curve is selected so that the optical power thereof on one side of the source projection axis changes at a faster rate than the optical power on the other side of the source projection axis to provide the asymmetric illumination distribution pattern of the apparatus.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
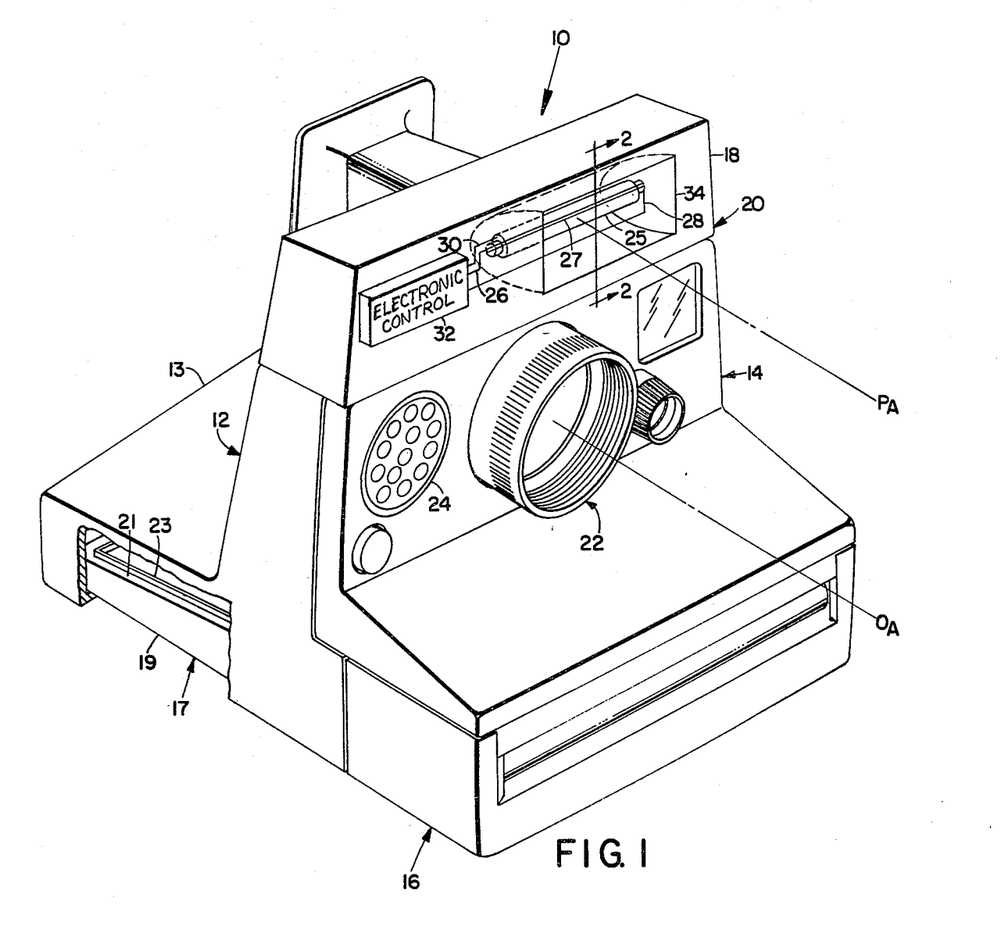
FIG. 1 is a perspective view with parts broken away of the photographic camera apparatus of the invention.

The present invention in general relates to photography and in particular to an electronic flash apparatus which can be either built into a photographic camera or camera apparatus or structured in a well-known manner for detachable connection with such apparatus. In its preferred embodiment, the electronic flash apparatus of the present invention is shown as part of a virtually fully automatic type camera which utilizes self-processable type film and which is designated generally at 10 in FIG. 1. Although shown incorporated in the camera 10, it is to be understood that the electronic flash apparatus of the invention, which is designated generally at 20 in FIG. 1, is not limited in use to only those types of photographic apparatus represented by the camera 10. However, as will be discussed below, the camera 10 does have certain features which make the invention at least in part particularly suitable for use with it.

As best seen in FIG. 1, the camera 10 is a rigid, non-folding body type which includes a generally prismatic shaped major housing 12, a generally L-shaped front housing 14, a generally rectangularly-shaped film loading door 16, and a generally rectangularly-shaped electronic flash housing 18 which collectively define its outward appearance and serve to house and protect its interior components. The aforementioned housings, 12, 14, 18, and the film loading door 16 are all preferably molded of an opaque plastic to preclude unwanted light from entering the camera interior.

The base of the prismatic housing 12 is adapted in a well-known manner to releasably receive and hold a film cassette 17 in which is disposed a stacked array of self-processable film units, each of which is processed by the camera 10 in a well-known manner after photoexposure, and a flat, thin battery which is positioned underneath the array of film units (neither shown). The film cassette 17 includes a generally parallelepiped housing 19 which has an upwardly facing wall 21 having a generally rectangular aperture 23 therein. An example of such film cassettes is described in considerable detail in U.S. Pat. No. 3,872,487 issued to Nicholas Gold on Mar. 18, 1975 and entitled "Photographic Film Assemblage and Apparatus" and of such film units in, for example, U.S Pat. Nos. 3,415,644; 3,594,165; and 3,761,268.

Located in the vertical forward wall of the L-shaped housing 14 is an objective taking lens 22 for imaging light from the scene onto the film contained in the cassette 17. The objective taking lens 22 may be a Cooke Triplet or similar multi-element type of lens which may have its focal length changed by adjusting the axial air spacing between its optical elements.

Focusing of the objective taking lens 22 is accomplished automatically through the use of a well-known ultrasonic ranging system which operates on well-known principles. Ultrasonic energy is transmitted by the system from an ultrasonic transducer 24 toward a subject to be photographed and is thereafter reflected by the subject back toward the camera 10. The characteristics of the transmitted and received signals are then compared to derive a control signal representative of the subject distance. The control signal is thereafter utilized to alter the air spacing between the elements of the objective taking lens 22 in order to set the air spacing in a manner appropriate to obtain sharply imaged photographs for the subject distance determined by the ultrasonic ranging system.

Figure 3:
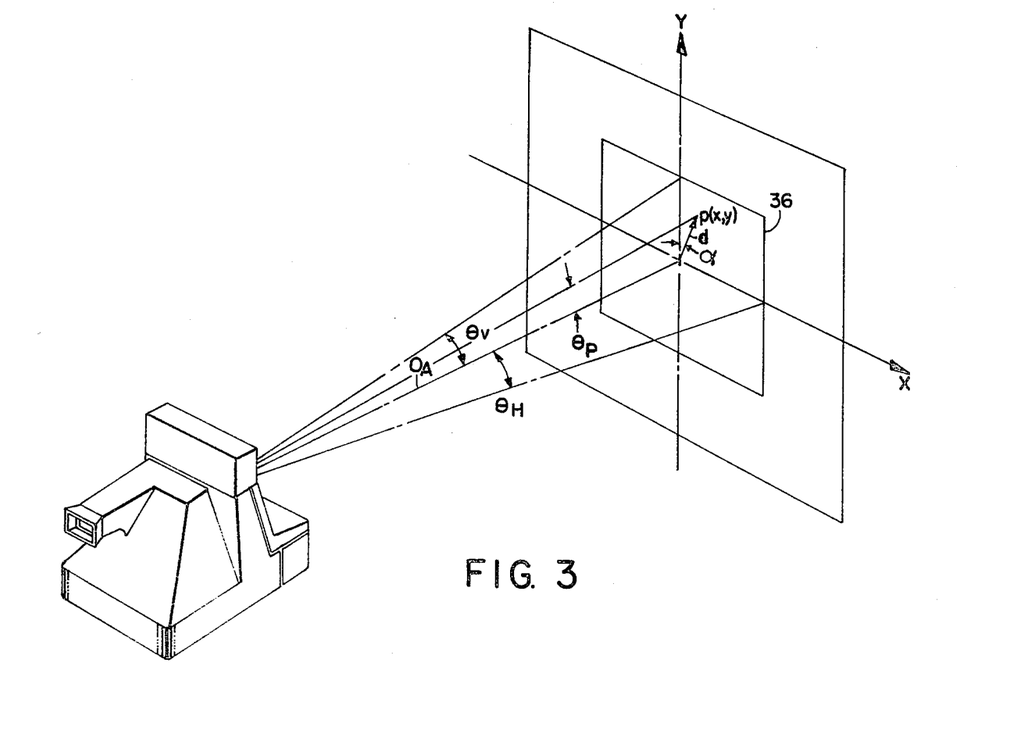
FIG. 3 is a diagrammatic perspective view of the apparatus of FIG. 1 positioned forwardly of a normal plane in which the intensity of illumination provided by the apparatus can be measured.

The body 12 also includes a generally planar rear wall 13 which is slanted at a predetermined angle with respect to both the film cassette upwardly facing wall 21 and the optical axis, OA, of the objective taking lens 22. Attached to the interior of the rear wall 13, but not shown, is a trapezoidal shaped mirror positioned along the optical axis, OA, intersecting it at a predetermined angle, to provide a folded optical path between the objective taking lens 22 and an uppermost one of the stacked array of film units located in the film cassette 17. With this optical arrangement, rays from the scene being photographed, which emerge from the objective taking lens 22, are reflected from the mirror toward the film units to expose them. Moreover, it will be recognized by those skilled in the art that with this optical arrangement, the objective taking lens 22 and the peripheral edges of a film unit or the edges of the aperture 23 cooperate to provide the camera 10 with a field of view which defines the area in object space (the scene) that the camera 10 will record when a picture is taken. Referring to FIG. 3, the field of view of the camera 10 is specified by the semi-field angles, $\theta_v$ for the vertical, and $\theta_h$ for the horizontal.

After the objective taking lens 22 has been appropriately focused by the camera ultrasonic ranging system, film exposure takes place and is regulated by a well-known automatic exposure control system which operates to control the amount of exposure delivered to the film by selectively controlling the movement of a shutter blade mechanism (not shown). The blade mechanism comprises a pair of counter-reciprocating blades each of which includes an aperture which are made to overlap one another to provide a preprogrammed set of aperture values and shutter speeds over the entrance to the camera optical system light path. For this purpose, the blades are situated immediately forward of the camera light path entrance aperture which is located in registration with the objective taking lens 22 and are of the type more fully described in U.S. Pat. No. 3,942,183 issued to George D. Whiteside on Mar. 2, 1976 and entitled "Camera With Pivoting Blades".

The exposure control system (not shown) of the camera 10 includes the ultrasonic or sonar rangefinder for first determining camera-to-subject distance and then setting the objective taking lens focus condition to correspond to the determined camera-to-subject distance. Thereafter, the camera exposure control system provides a flash firing signal which occurs at an appropriate exposure aperture also corresponding to the determined camera-to-subject distance in a manner providing for a proportional fill-in flash under conditions of high ambient scene light intensity. Such an exposure control system is described in U.S. patent application Ser. No. 017,425 filed on Mar. 5, 1979 in the name of Bruce K. Johnson et al. and entitled "Camera With Auto Ranging Focusing and Flash Fire Control".

As will be appreciated by those skilled in the art, the various camera subsystems enumerated and, in addition, the requirement that the camera possess a system for automatically transporting and processing a self-developing film unit to its exterior after photoexposure, place unusual power demands on the film cassette battery. To provide maximum utility of the power available from the battery, the camera 10 also preferably includes an electronic control system which schedules the various current demands on the battery at different times so that no two of its systems are competing for battery power at the same time. Such a system is described in previously-referenced U.S. Pat. No. 4,156,565.

The electronic flash 20 of the invention is structured in a manner to be described to most efficiently utilize the power that has been scheduled for it by the camera electronic control system. The manner in which the electronic flash 20 accomplishes this may best be understood by now referring to FIGS. 1 and 2 wherein it can be seen that the electronic flash 20 comprises an artificial source 25 for illuminating the scene. The artificial source 25 preferably comprises a conventional elongated, cylindrical flash tube which produces a brilliant flash of illumination through the well-known process of vapor discharge. For this purpose the flash tube 25 includes positive and negative terminals 26 and 28, respectively, which attach to an electrode 27 extending through the flash tube 25 along its axis of rotation and a trigger terminal 30 all of which are connected to a well-known electronic control circuit 32 which operates in a well-known manner to charge a storage capacitor (not shown) from the cassette battery and to selectively discharge the flash tube 25 at an appropriate time in coordination with the camera exposure control system. The electronic control circuit 32 is controlled by the camera electronic charge regulation system (previously mentioned but not shown).

Extending through the electronic flash tube 25 is a projection axis, PA, along which light from the flash tube 25 generally travels. The flash tube 25 is positioned within the housing 18 in a predetermined manner and is structured so that light directly emanating therefrom fills a solid angle that is larger than is necessary to illuminate the camera angular field of view. Those skilled in the art will recognize that the strobe tube 25 radiates light in all directions and for this reason behaves as an extended cylindrical source which from geometric considerations naturally tends to illuminate a solid angle much larger than a photographic camera angular field of view would reasonably occupy. Therefore much of the radiant energy which is contained in the flash of illumination provided by the electronic tube 25 would not normally be directed towards the photographic scene. However, to make more effective use of the radiant energy available from the electronic flash tube 25 an asymmetric reflector 34 (FIG. 2) is provided.

Figure 2:
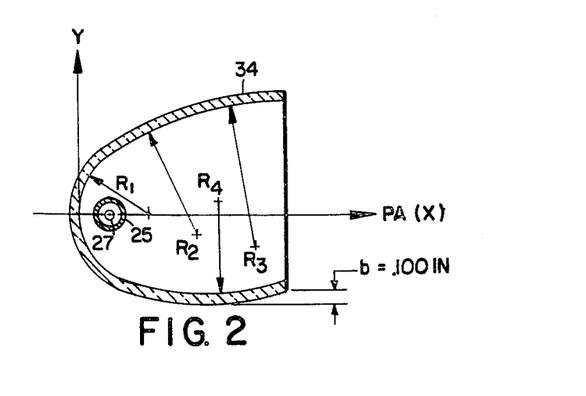
FIG. 2 is a cross-sectional view of part of the apparatus of FIG. 1 taken generally along line 2—2 of FIG. 1.

The reflector 34 is elongated, open-ended and concave in the direction of the photographic scene. The width of the reflector is generally coextensive with the length of the elongated electronic flash tube 25 and the reflector 34 surrounds the tube to intercept light emanating therefrom to direct such light in a preselected manner onto the photographic scene. The reflector shape was experimentally determined in a manner and for reasons which will be subsequently explained.

The asymmetric shape of the reflector 34 is achieved by first forming a symmetric aluminum reflector of predetermined thickness and thereafter further bending one-half of the symmetric reflector by a predetermined amount. The initial shape of the symmetric reflector is given by the Cartesian coordinates in Table I below:

TABLE I

| X (in) | Y (in) |
|---|---|
| 0 | 0 |
| .030 | .115 |
| .164 | .249 |
| .388 | .343 |
| .615 | .384 |
| .788 | .397 |

The shape of the upper half (above PA, or the X-axis in FIG. 2) of the asymmetric reflector 34 of the invention has the same coordinates as given in Table I while its lower half has the shape which the aluminum takes on by permanently deflecting the end of the lower half by a distance, b=0.100 inch, as shown in FIG. 2 without distorting the shape of the upper half. Bending of the lower half of the reflector 34 can be accomplished in a well-known manner. For this reflector shape, the flash tube 25 is selected to have a diameter of approximately one-tenth of an inch and is spaced forward of the apex of the reflector 34, along the X-axis, by a distance of 0.020".

Thus configured, the reflector 34 has a constant cross-sectional shape as measured in planes perpendicular to its elongated dimension. As seen in FIG. 2, the cross-sectional shape of the reflector is in the form of a complex curve which for purposes of illustration can be considered as a series of linked together circular segments having different radii and center of curvatures which approximate the reflector curve shape. When considered in this way, the smaller radii of curvature illustrated diagrammatically as $R_1$, which is near the apical region of the reflector 34, operates to control radiation emanating from the flash tube in regions which are near the projection axis, PA. Those radii of curvature exemplified by $R_3$ and $R_4$ operate to control radiation near the extreme edges of the camera angular field of view and intermediate radii of curvature, exemplified by $R_2$, operate to control radiation in regions of the scene intermediate the camera extreme angular field of view near the center of the picture area.

The upper portion of the reflector 34, i.e., the portion above the projection axis, PA, in FIG. 2, operates to direct radiation into the lower region of the picture field while the portion of the reflector which is below the projection axis, PA, operates to control the distribution of illumination provided by the electronic flash 20 in regions above the optical axis of the camera corresponding to the upper portion of the picture. The optical power of the reflector is proportional to the local radius of curvature as those skilled in the art will appreciate and changes with distance along the complex curve representing its profile. On one side of the source projection axis, PA, the optical power changes at a faster rate than the optical power on the opposite side thereof.

The asymmetric shape of the reflector 34 operates to provide a vertically asymmetric distribution of illumination over the picture area with the peak illumination occuring at the central upper part of the picture area. This will best be understood by describing, in conjunction with the diagram of FIG. 3, a method by which the characteristic distribution of illumination intensity for the electric flash 20 can be measured and characterized.

Referring now to FIG. 3, the camera 10 is shown positioned forwardly of a plane defined by an orthogonal coordinate system (X-Y axis) whose origin is coincidental with the optical axis, OA, of the camera 10. The plane thus defined is arranged normal to the optical axis, OA, and is preferably spaced away from the camera 10 by a distance which is representative of the distances at which flash pictures are expected to be taken with the camera 10. Delineated on the normal plane is a rectangle 36 which generally defines the area which would be imaged within the field of view of the camera 10; the X-axis corresponding to the horizontal and the Y-axis corresponding to the vertical when the camera 10 is held in its normal picture taking attitude. As previously mentioned the angle $\theta_v$ and $\theta_h$ represent respectively the semi-field angles in the vertical and horizontal directions.

Once the normal plane is defined and the field of view of the camera is established on it, photo-integrators (not shown) are placed on the plane at equally spaced apart points surrounding the origin or optical axis, OA. The electric flash 20 is then fired, the total flux at each point measured in some conventional units such as meter-candle-seconds and the resultant data tabulated in a form convenient for graphical presentation. For example, the location of a point, P (x, y), can be expressed in terms of its distance, d, from the origin and an angle α which is the angle between a line drawn from the origin, O, to the point P and the y-axis or by the angle α and a semi-field angle, $\theta_p$, which is the angle between the optical axis, OA, and a line drawn from the center of the objective taking lens 22 to the point, P(x, y). Either convention for describing the location of all points on the normal plane is acceptable.

Figure 4:
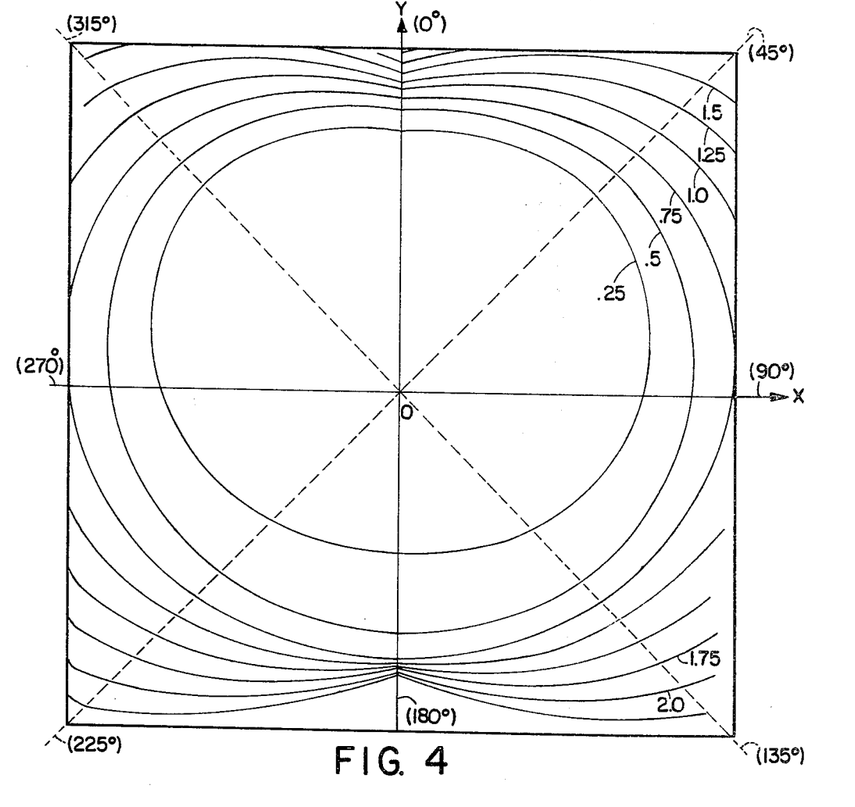
FIG. 4 is a contour plot showing the distribution of the intensity of light provided by the invention as measured in the normal plane in FIG. 3—each contour line thereof representing constant light intensity.

The distribution of illumination for the foregoing configuration of the electronic flash 20 measured in the foregoing manner on a normal plane spaced approximately 5 feet forward of the electronic flash 20 is presented in FIG. 4 as a series of contour lines each representing the difference in illumination expressed in stops when compared to the peak intensity of illumination measured on the normal plane. Thus, for example, the contour line identified as 0.25 is a line of constant illumination intensity which is −0.25 stops lower than the peak intensity measured on the normal plane. The other contour lines identified as 0.5, 0.75, and so forth, indicate lines of constant illumination intensity which are also lower than the peak intensity. The calculations for arriving at the contour lines were made in accordance with the following equation:

$$\text{Difference in stops} = \log_2 \left( \frac{\text{measured intensity}}{\text{measured peak intensity}} \right)$$

The rectangle 36 in FIG. 4 indicates the boundaries of the camera field of view which, in this case, has a semi-field angle of approximately 19° for both the horizontal and vertical directions.

Figure 5:
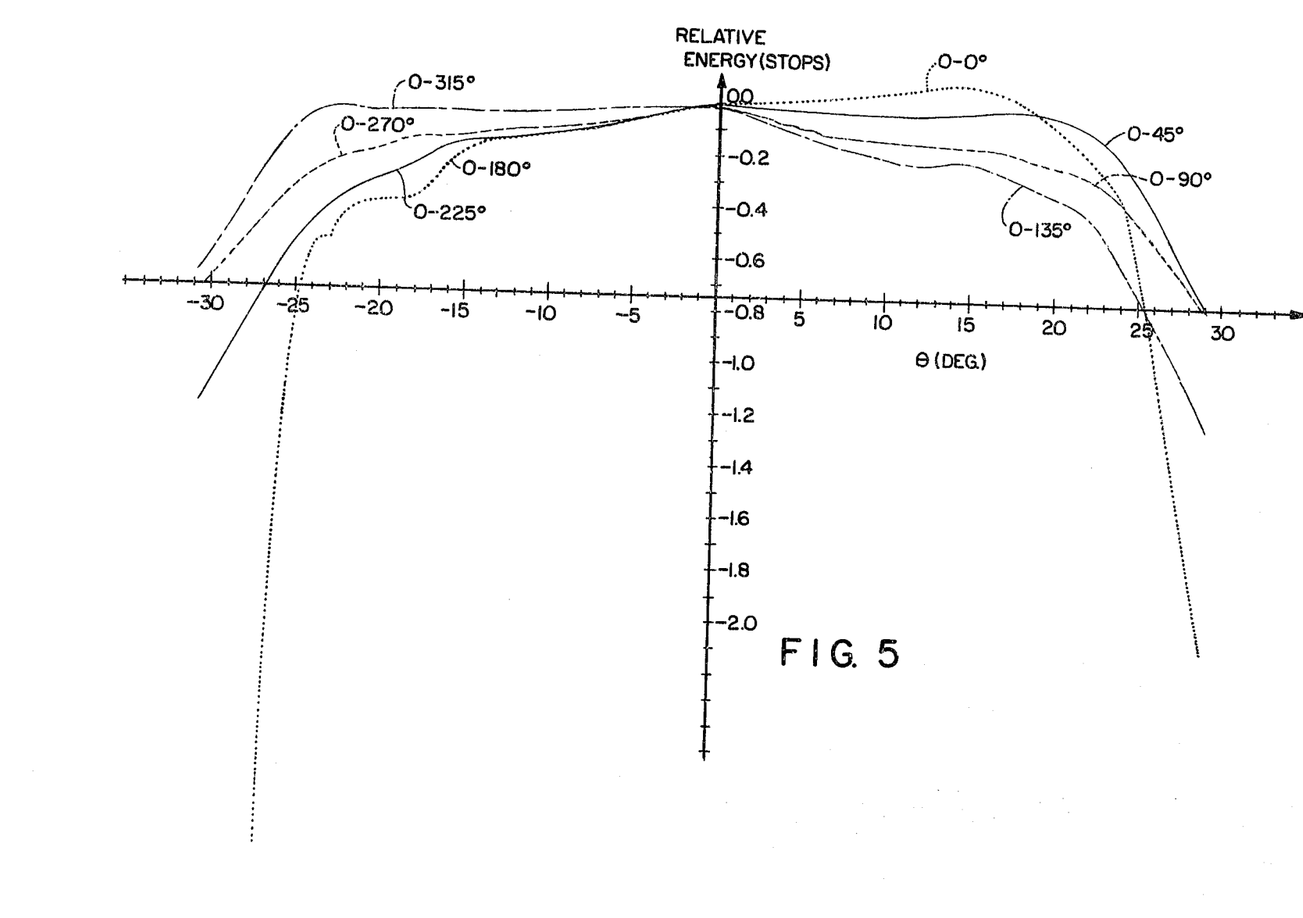
FIG. 5 is a graph showing the intensity of illumination as a function of angular field position along different lines of the normal plane of FIG. 3.

FIG. 5 presents the variation in the intensity of the illumination over the normal plane as a function of semi-field angle, θ, for points on different lines in the normal planes oriented at different angles, α, as shown on the contour map of FIG. 4. The semi-field angle, $\theta_p$, represents the position of a point P (x, y) along each one of the lines where the angle, α, is a constant. Thus the curve in FIG. 5 identified as 0°—0° represents the change in illumination (relative energy in stops) with semi-field angle, $\theta_p$, as measured along the line correspondingly identified as 0°—0° in FIG. 4. The other curves in FIG. 5 likewise are associated with the correspondingly identified lines given in FIG. 4. Positive θ in FIG. 5 represents the illumination distribution to the right of the 0°-180° line of FIG. 4 while negative θ represents the field positions of points located to the left of the 0°-180° line in FIG. 4. The change in illumination in FIG. 5 is expressed in stops which indicates the relative intensity of the various points in the normal plane compared with the peak intensity measurement made.

In both FIGS. 4 and 5, it can be appreciated that the angular distribution in the intensity of the illumination which is provided by the electronic flash 20 is asymmetric about the source projection axis, PA, when measured in at least one reference plane, i.e., the plane formed by extending the 0°-180° line in FIG. 4 perpendicuar to the normal plane of FIG. 3 and through the source projection axis, PA. This reference plane is thus parallel to the general direction of projection of the beam provided by the electronic flash 20. The angular intensity distribution of the beam of illumination of the electronic flash 20, in the reference plane (see 0°-180° line of FIG. 4), decreases in correspondence with semi-field angle on one side of the source projection axis, PA, at a faster rate than on the opposite side thereof so that points in a photographic scene which are spaced ahead of the camera and located on one side of the camera optical axis, OA, are more intensely illuminated than equidistant correspondingly located scene points on the other side of the camera optical axis. That is, points in FIG. 4 which are located above the 90°-270° line are more intensely illuminated than correspondingly located points below the 90°-270° line. Thus, the asymmetric distribution of illumination provided by the electric flash 20 operates to increase the illumination range of the apparatus with respect to subject matter located above the 90°-270° (horizontal) line which represents the upper half of the scene, above the camera optical axis, OA, since points located in the upper half of the scene are more intensely illuminated.

The intensity of the illumination provided by the electronic flash 20 represented by the graphs and plots of FIGS. 4 and 5 represent the illumination distribution pattern which would obtain in the photographic scene assuming the camera 10 were held in its normal picture taking attitude. From the information presented in FIGS. 4 and 5 it can be readily appreciated that the beam of illumination provided by the electronic flash 20 has a predetermined angular divergence which is generally coextensive with the camera field of view when the electronic flash 20 is mounted or permanently built into the camera 10. The reflector 34 of the electronic flash 20 thus operates to increase the total amount of light falling on a scene to be photographed compared with the amount of direct light from the flash tube 25 that would otherwise illuminate a scene absent the reflector 34 and operates to provide an asymmetric distribution of illumination by shifting the angular distribution of the light without substantially changing its total angular divergence. Thus, no loss of light occurs compared with a symmetric reflector while the illumination provided by the strobe tube 25 has been shifted in a more useful way to a location in the scene where important subjects are most likely to be situated during picture taking. Thus, the useful range of the electronic flash 20 is increased compared to what it would otherwise be if the illumination distribution were symmetrically disposed about the camera optical axis, OA. In this manner, an increase in range is obtained for a given amount of energy available to charge the capacitor of the electronic flash 20 without requiring additional power for this purpose. In addition, certain aesthetic benefits are obtained since it is most likely that the important subject matter in the scene will occur in the upper regions of the scene and therefore the light which is provided by the electronic flash 20 is selectively directed to those regions to provide what is considered to be a more beneficial illumination pattern for exposure purposes.

The shape of the reflector 34 for the particular illumination distribution pattern described above was arrived at by an iterative empirical process which invovled the steps of evaluating various reflector shapes through the measurement method outlined above followed by photographic evaluation and repeating these steps until the reflector shape was judged acceptable.

Figure 6:
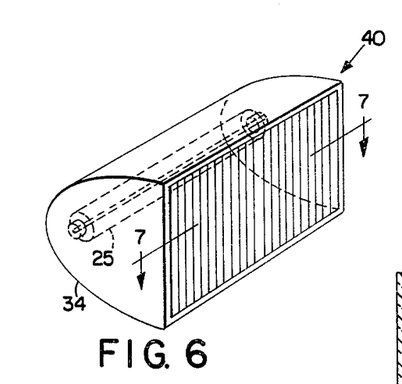
FIG. 6 is a perspective view of an alternate embodiment for the invention.
Figure 7:
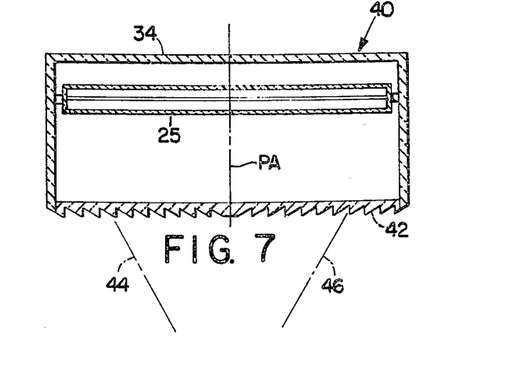
FIG. 7 is a cross-sectional view of the embodiment of FIG. 6 taken generally along line 7—7 of FIG. 6.

Referring now to FIGS. 6 and 7 there is shown an alternate embodiment for the electronic flash apparatus of the invention. The alternate embodiment for the electronic flash apparatus, which is designated at 40 in FIGS. 6 and 7, has the same flash tube 25 and reflector 34 which are included in the first embodiment of the invention and in addition includes a cylindrical Fresnel lens 42 which is positioned to receive light emerging from the open end of the reflector 34 and is structured in a well-known manner to direct light intercepted thereby toward a vertical axis through the normal plane (line 0°–180° in FIG. 4 or the y-axis in FIG. 3) as indicated by the direction of travel of a pair of exemplary light rays, 44 and 46, in FIG. 7. This is done so that the intensity of illumination of scene points correspondingly located on either side of the vertical is increased by equal amounts compared to what the intensity of illumination would be absent the lens 42 such that the overall amount of illumination on the scene is further increased compared with what it would be absent the lens 42 and such that the angular distribution of illumination on either side of the vertical is symmetric thereabout.

Figure 8:
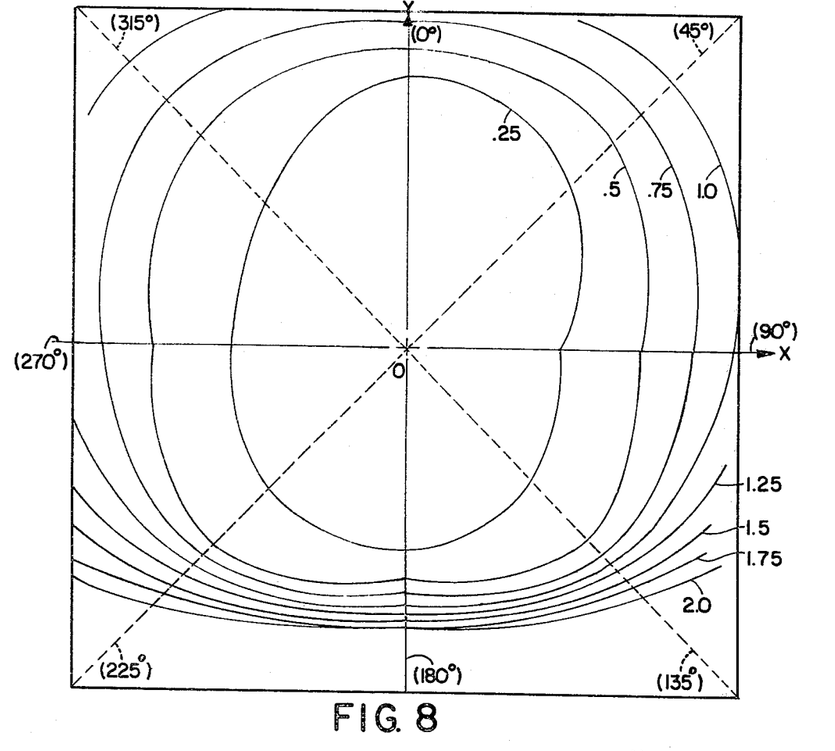
FIG. 8 is a contour plot showing the distribution of the intensity of light provided by the alternate embodiment of the invention as measured in the normal plane in FIG. 3.
Figure 9:
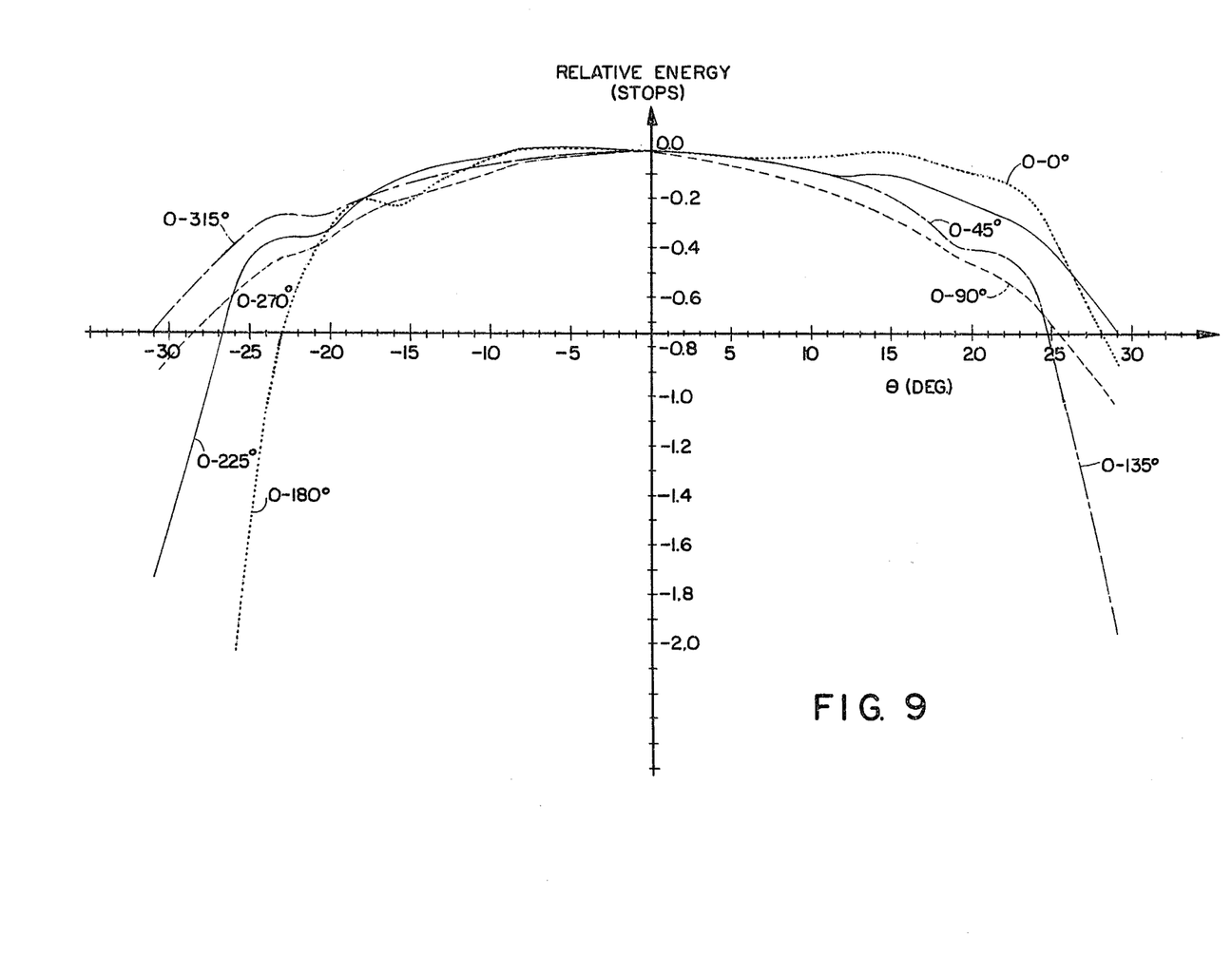
FIG. 9 is a graph similar to FIG. 5 but is for the alternate embodiment of FIGS. 6 and 7.

FIGS. 8 and 9 show, in a manner similar to the information presented in FIGS. 4 and 5, the illumination distribution measurements made for the alternate embodiment 40 of the invention. The conventions in FIGS. 8 and 9 are the same as those described with respect to FIGS. 4 and 5.

It can be seen from the illumination distribution patterns in FIGS. 8 and 9 that the upper regions of a scene are still more intensely illuminated than those in the lower region as was the case with the first embodiment of the electronic flash of the invention. However, the illumination distribution pattern for the alternate embodiment as best illustrated in FIG. 8 is made nearly symmetric about the vertical. FIG. 8 indicates that points located on either side of the vertical axis (0°–180° line) are more intensely illuminated as indicated by the fact that the contour lines are more closely bunched toward the vertical axis compared with correspondingly identified contour lines in FIG. 4.

Certain changes may be made in the above-described embodiments without departing from the scope of the invention and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Photographic lighting apparatus for use with a photographic camera having an optical axis and a given angular field of view to provide a beam of illumination to preferentially illuminate a photographic scene within the camera field of view, said apparatus comprising:

a housing including means for facilitating the attachment of said apparatus to the camera in a predetermined manner;

a source of illumination for projecting light about an axis therethrough, said source of illumination being positioned within said housing in a predetermined manner and being structured so that light directly emanating therefrom fills a solid angle that is larger than is necessary to illuminate the camera angle field of view; and means for receiving light from said source of illumination which would otherwise not directly illuminate subject matter within the camera angular field of view and directing such light into a beam of illumination of predetermined angular divergence which is generally coextensive with the camera field of view when said apparatus is mounted on the camera, said beam of illumination operating to increase the total amount of light falling on a scene to be photographed compared with the amount of direct light from said source that would otherwise illuminate a scene absent said light directing means and having an angular distribution in the intensity of its illumination which is asymmetric about said source projection axis when measured in at least one reference plane through said source projection axis and parallel to the general direction of projection of said beam, said angular intensity distribution of said beam in said reference plane decreasing in correspondence with angle on one side of said source projection axis at a faster rate than on the opposite side thereof so that points in a photographic scene, spaced ahead of the camera and located on one side of the camera optical axis, are more intensely illuminated than equidistant correspondingly located scene points on the other side of the camera optical axis, said asymmetric distribution of illumination operating to increase the illumination range of said apparatus with respect to subject matter located on the side of the camera optical axis which is more intensely illuminated.

2. The apparatus of claim 1 wherein said illumination source comprises an elongated, cylindrical tube and wherein said light directing means comprises an elongated, open-ended, concave reflector of given width which surrounds said tube and has a constant cross-section as measured in planes perpendicular to its elongated dimension, said reflector cross-section having a shape in the form of a complex curve that is asymmetric about said source projection axis, said reflector curve shape having optical power which changes with distance along said curve and being selected so that the optical power thereof on one side of said source projection axis changes at a faster rate than the optical power on the other side of said source projection axis to provide said asymmetric illumination distribution pattern of said apparatus.

3. The apparatus of claim 2 wherein said source projection axis is offset with respect to the camera optical axis.

4. The apparatus of claim 2 further including a cylindrical lens positioned to receive light emerging from said reflector open end and structured to direct light intercepted thereby toward said reference plane so that the intensity of illumination of scene points correspondingly located on either side of said reference plane is increased by equal amounts compared to what the intensity of illumination would be absent said cylindrical lens such that the overall amount of illumination on a scene is increased and the angular distribution of illumination on either side of said reference plane is symmetric thereabout.

5. The apparatus of claim 4 wherein said cylindrical lens is a Fresnel lens of predetermined focal length.

6. Photographic camera apparatus comprising:

a housing including means for defining an exposure area at a focal plane in which film may be positioned for exposure;

a variable focus objective taking lens having an optical axis and mounted within said housing so that a real image of a scene to be photographed may be formed on said focal plane by said objective taking lens, said objective taking lens and said exposure area at said focal plane cooperating to provide a field of view for said camera;

a source of illumination for projecting light about an axis therethrough, said source of illumination being positioned within said housing in a predetermined manner and being structured so that light directly emanating therefrom fills a solid angle that is larger than is necessary to illuminate the camera angle field of view; and means for receiving light from said source of illumination which would otherwise not directly illuminate subject matter within the camera angular field of view and directing such light into a beam of illumination of predetermined angular divergence which is generally coextensive with the camera field of view, said beam of illumination operating to increase the total amount of light falling on a scene to be photographed compared with the amount of direct light from said source that would otherwise illuminate a scene absent said light directing means and having an angular distribution in the intensity of its illumination which is asymmetric about said source projection axis when measured in at least one reference plane through said source projection axis and parallel to the general direction of projection of said beam, said angular intensity distribution of said beam in said reference plane decreasing in correspondence with angle on one side of said source projection axis at a faster rate than on the opposite side thereof so that points in a photographic scene, spaced ahead of the camera and located on one side of the camera optical axis, are more intensely illuminated than equidistant correspondingly located scene points on the other side of the camera optical axis, said asymmetric distribution of illumination operating to increase the illumination range of said apparatus with respect to subject matter located on the side of the camera optical axis which is more intensely illuminated.

7. The apparatus of claim 6 wherein said illumination source comprises an elongated, cylindrical tube and wherein said light directing means comprises an elongated, open-ended, concave reflector of given width which surrounds said tube and has a constant cross-section as measured in planes perpendicular to its elongated dimension, said reflector cross-section having a shape in the form of a complex curve that is asymmetric about said source projection axis, said reflector curve shape having optical power which changes with distance along said curve and being selected so that optical power thereof on one side of said source projection axis changes at a faster rate than the optical power on the other side of said source projection axis to provide said asymmetric illumination distribution pattern of said apparatus.

8. The apparatus of claim 7 wherein said source projection axis is offset with respect to the camera optical axis.

9. The apparatus of claim 7 further including a cylindrical lens positioned to receive light emerging from said reflector open end and structured to direct light intercepted thereby toward said reference plane so that the intensity of illumination of scene points correspondingly located on either side of said reference plane is increased by equal amounts compared to what the intensity of illumination would be absent said cylindrical lens such that the overall amount of illumination on a scene is increased and the angular distribution of illumination on either side of said reference plane is symmetric thereabout.

10. The apparatus of claim 9 wherein said cylindrical lens is a Fresnel lens of predetermined focal length.

* * * * *